Figure 1:
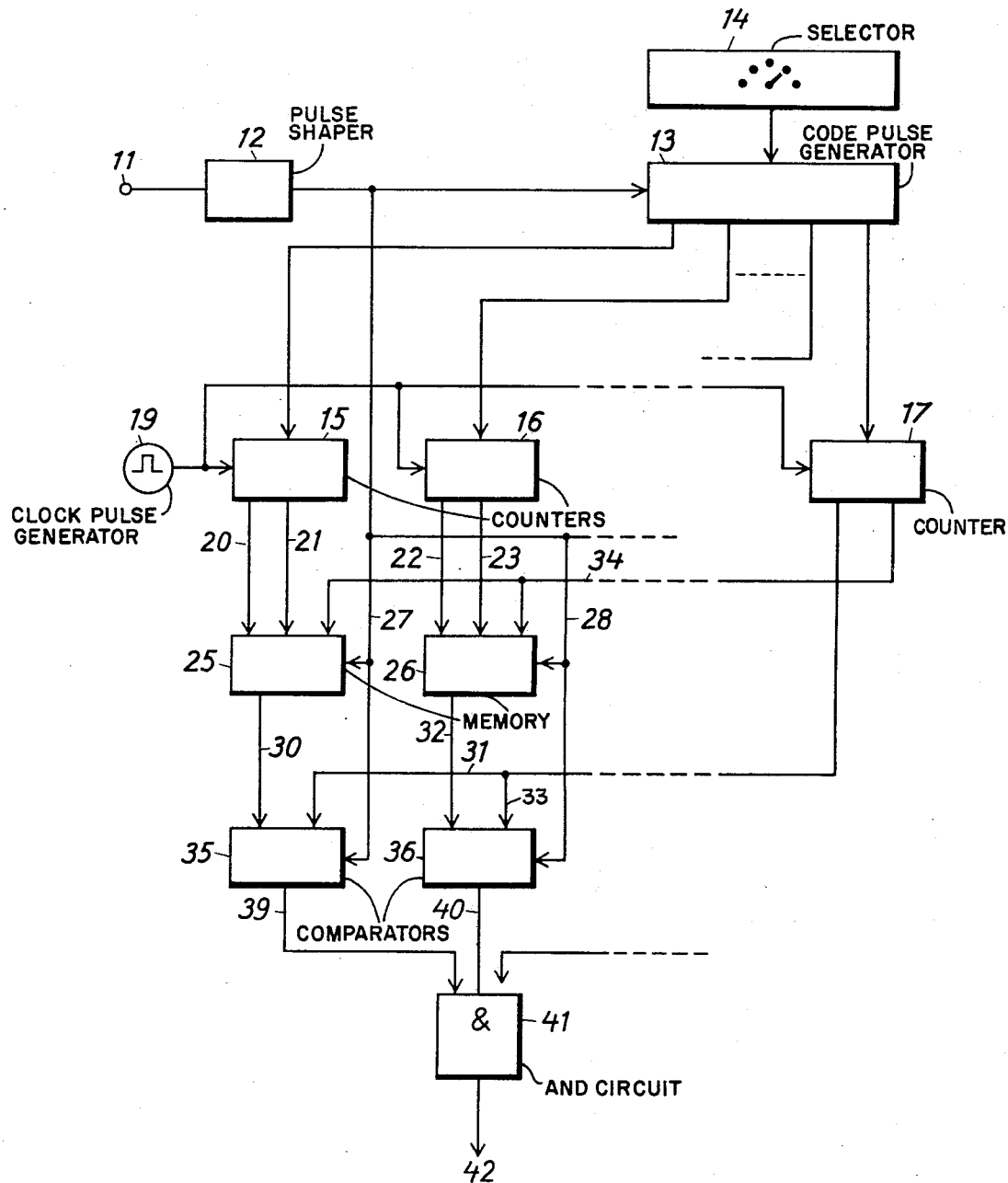

United States Patent [19]
Pettersson

[11] 3,942,152
[45] Mar. 2, 1976

[54] VERIFICATION ARRANGEMENT
[75] Inventor: Georg Gustaf Lennart Pettersson, Jarfalla, Sweden
[73] Assignee: Telefonaktiebolaget L M Ericsson, Stockholm, Sweden
[22] Filed: Nov. 11, 1974
[21] Appl. No.: 522,622

[30] Foreign Application Priority Data
Nov. 22, 1973 Sweden .......................... 7315808

[52] U.S. Cl. 340/146.1 D; 178/69.5 R; 179/15 AW; 340/146.2
[51] Int. Cl.² ..................... H04L 7/00; G01S 9/00
[58] Field of Search... 340/146.1 D, 146.1 C, 146.2; 343/5 DP, 17.1 R; 178/69.5 R; 179/15 AW; 329/107

[56] References Cited
UNITED STATES PATENTS

| | | | |
|---|---|---|---|
| 3,363,235 | 1/1968 | Rhodes | 340/146.1 D |
| 3,493,929 | 2/1970 | Webb | 340/146.1 D |
| 3,691,305 | 9/1972 | Huebner et al. | 179/15 AW |
| 3,761,891 | 9/1973 | Markwitz | 340/146.1 D |
| 3,766,316 | 10/1973 | Hoffman et al. | 340/146.1 D |
| 3,855,593 | 12/1974 | Van Hijfte et al. | 343/5 DP |

Primary Examiner—Charles E. Atkinson
Attorney, Agent, or Firm—Hane, Baxley & Spiecens

[57] ABSTRACT

A pulse pattern detector includes a local pulse pattern generator starting in response to an incoming signal impulse whether or not it is included in the pulse pattern to be detected. There is a number of timing circuits for measuring the time lapsed from each of the pulses in the locally generated pulse pattern and memory means for storing the measured value of all but the last timing circuit as soon as a signal impulse is received. Comparators are provided to compare the contents of the memory means to find if all the memory circuits have recordings equal to a state of the timing circuit in which case a signal is generated indicating that the desired pulse pattern is detected in the incoming pulse sequence.

7 Claims, 6 Drawing Figures

VERIFICATION ARRANGEMENT

The present invention relates to an arrangement for verification of the fact that a signal includes a certain pulse pattern consisting of a determined number of pulses distributed in a determined manner in time. It often happens within the telecommunication field that identification signals are transmitted in order to selectively call a certain receiver. The identification signal has the form of a certain code, for example a determined number of pulses with determined mutual time positions. In order to detect if a desired code signal is present in a certain signal, for example the video signal from a radar receiver, it is common practice to use delay lines. A number of delay lines are used, each with a delay time which corresponds to the time position of one of the pulses in the code. When all the delay lines show an output signal simultaneously as the last pulse in the code arrives, an indication is obtained that the code has been received. An arrangement of this kind is large and ungainly and it is, furthermore, very difficult to change the code. In such a case the delay lines have to be provided with terminals for all desired combinations. An arrangement with delay lines is, furthermore, difficult to adjust and sensitive to variations in temperature.

None of these drawbacks exist in an arrangement according to the invention which utilizes digital techniques and therefore standard integrated circuits.

The characteristics of the invention appear from the accompanying claims.

Figure 2:
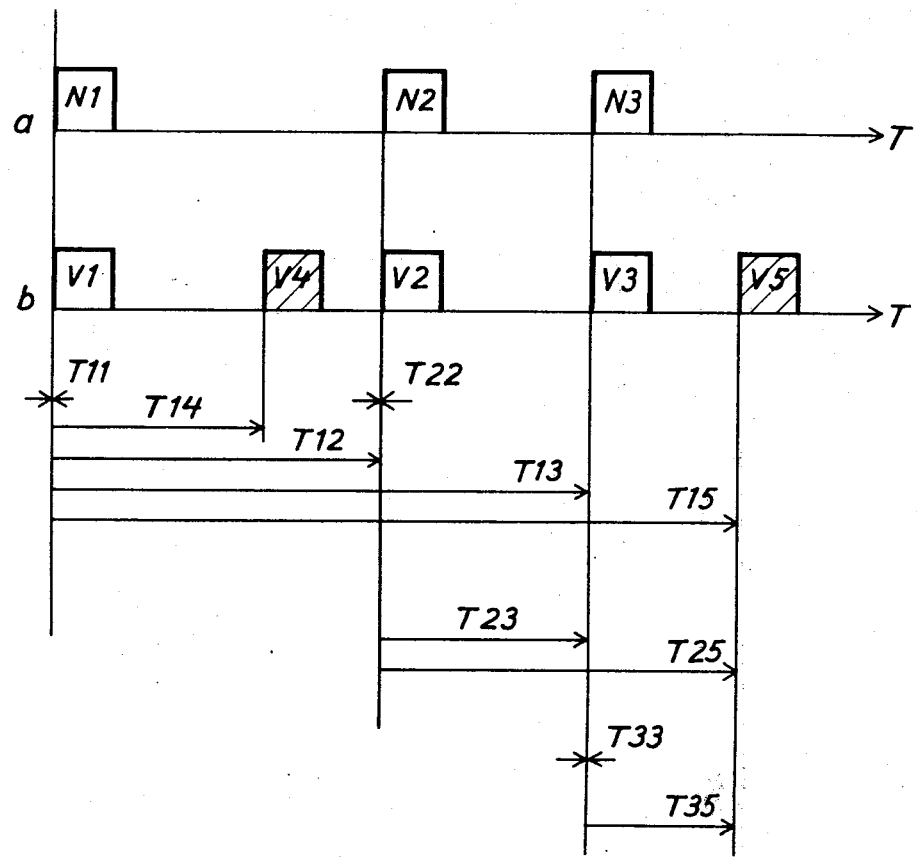
Figure 3:
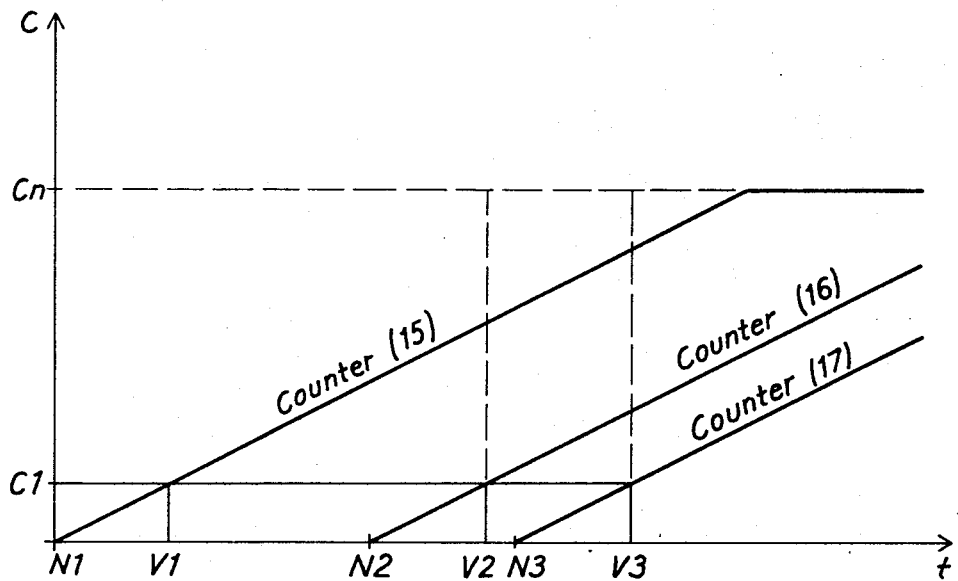
Figure 4:
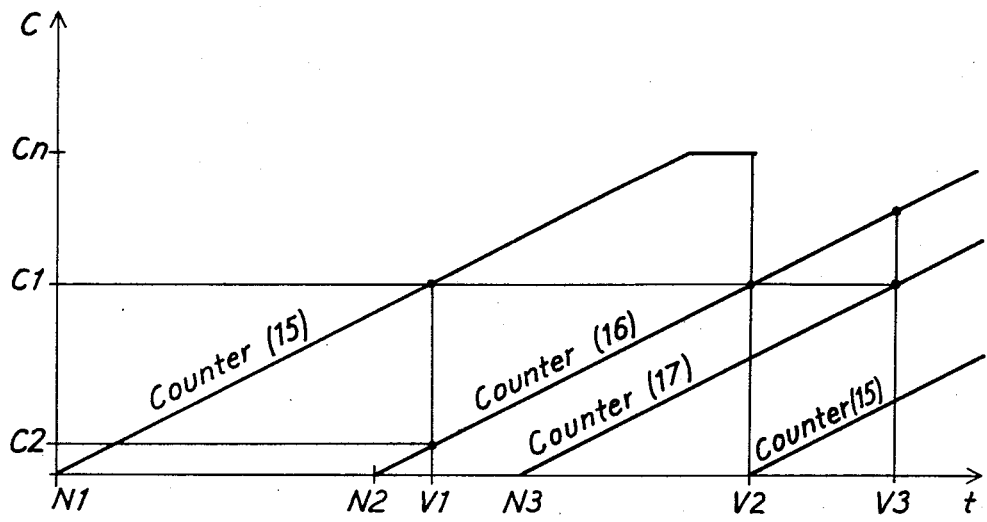
Figure 5:
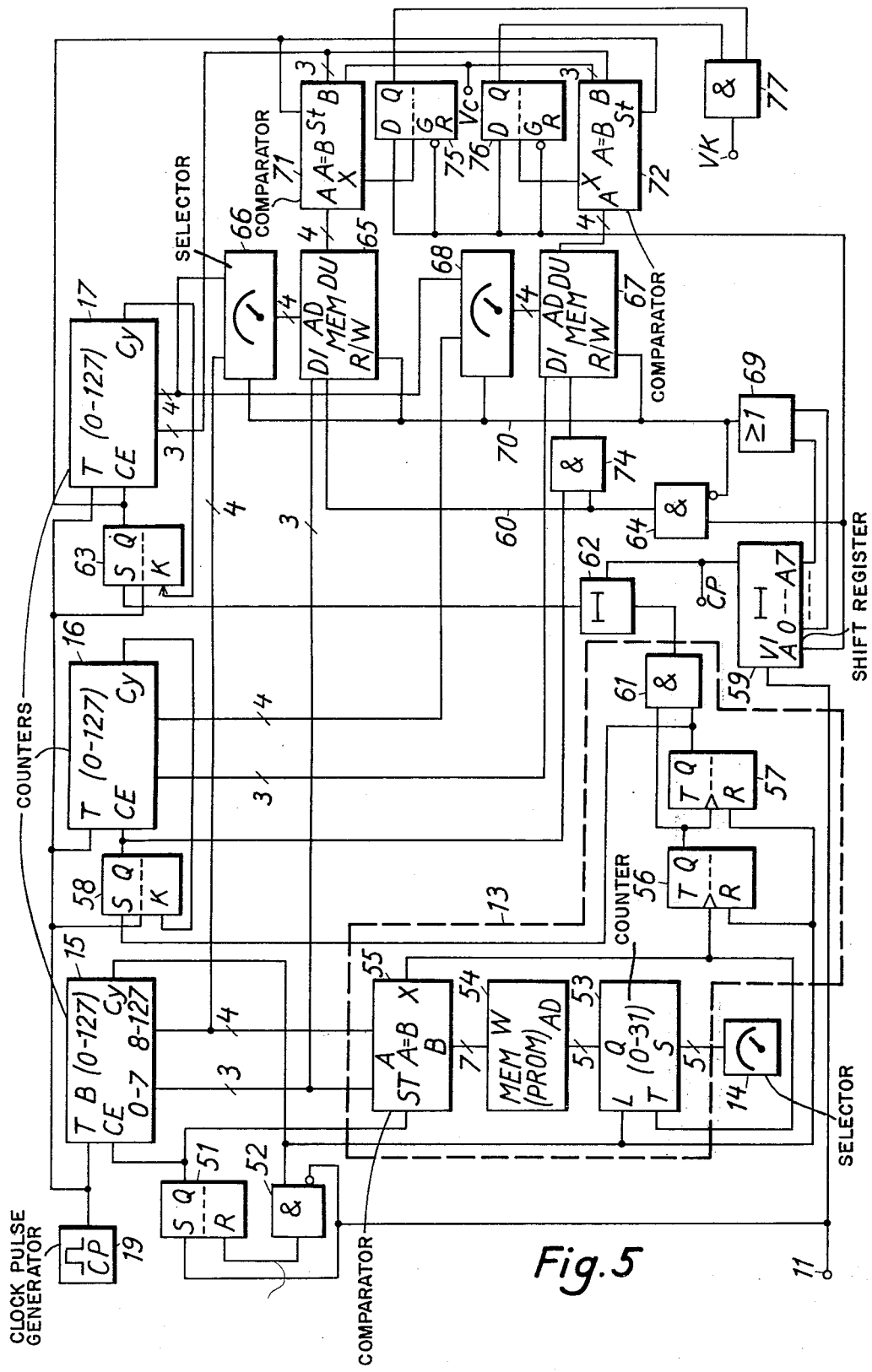
Figure 6:
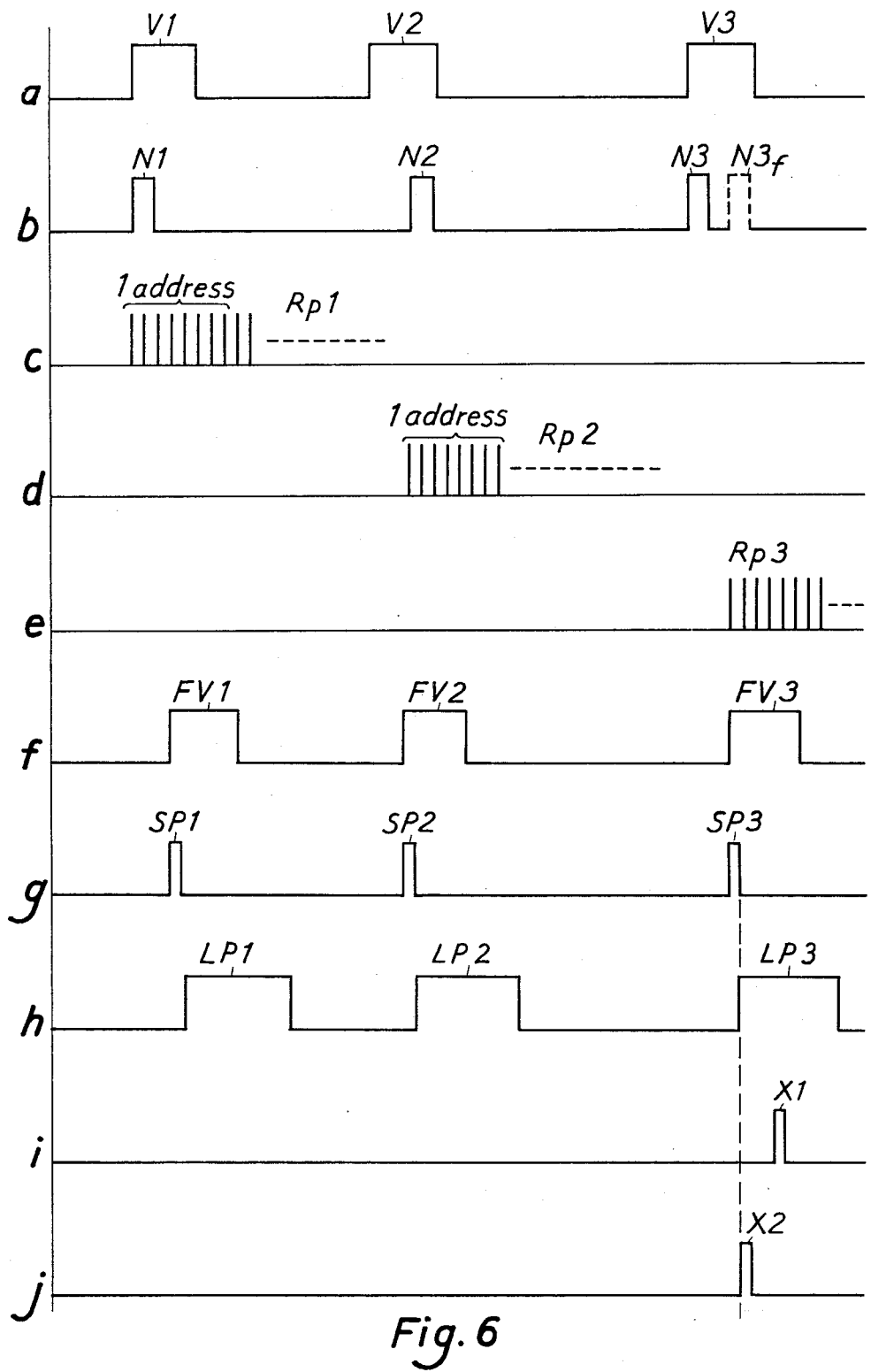

The invention will be explained more in detail in connection to the appended claims where FIG. 1 shows a simplified block diagram, FIG. 2 shows a time diagram for signals in the diagram according to FIG. 1, FIGS. 3 and 4 show diagrams of the verification process for two different cases, FIG. 5 shows a detailed block diagram for an arrangement according to the invention, FIG. 6 shows a signal diagram for the arrangement according to FIG. 5.

In FIG. 1 reference 11 is an input for pulse coded signals where the code is characterized by the position within a given time frame for a number of $n$ pulses. The pulses which, for example, consist of video signals from a radar receiver, are normalized in a pulse shaper 12 and are fed to a control unit in a code pulse generator 13, which locally produces the desired nominal pulse pattern routine. The pattern of the pulse sequences is determined by a selector 14.

The code pulse generator 13 controls a correlator consisting of n cells of which $n - 1$ are identical. The $n - 1$ cells only consist of a counter 15, 16, a memory 25, 26 and a comparator 35, 36. The last n:th cell has no memory and no comparator but has a counter 17. The counters are stepped forwards by pulses from a clock pulse generator 19. The counter operation is controlled, however, by the code pulse generator 13. The outputs 20, 21 and 22, 23 from the counters 15, 16 are connected to the memories 25 and 26 in such a manner that the $p$ most significant digits determine the address to a memory cell, while the $q$ least significant digits determine the data content in this cell. Writing and reading in the memories are under control of the incoming pulses from the pulse shaper or former 12 via the conductors 27, 28. The comparators 35, 36 which are connected to their associated memory 25, 26 via the conductors 30, 32 and to the counter 17 via the conductors 31, 33, compare the content in the $q$ less significant digits in a memory cell in the memory 25, 26 with the $q$ less significant digits of the counter 17. The address of the memory cell is determined by the $p$ most significant digits of the counter 17 which via the read address line 34 gives the read address to all memories. The outputs, for example 39, 40, from all comparators are connected to an AND-circuit 41 from the output 42 of which a signal indicating an accepted code is obtained only if all the comparators give an output signal which only can occur when signal from the pulse shaper 12 opens all the comparators via line 27 and 28.

In FIG. 2 pulse diagrams are shown for a code pulse including three elements. The diagram 2a shows the nominal pulse with the elements N1, N2 and N3. The diagram 2b shows a real incoming signal pulse including elements V1 to V5 where the cross hatched pulses V4 and V5 denote interferences. The pulse element V1 starts the pulse generator 13 which, after that, locally generates the code N1, N2, N3 determined by the code selector 14 no matter if further signal pulses arrive by pulse shaper 12 or not.

The first counter 15 is started by the incoming pulse and counts the clock pulses from the generator 19. When the false pulse V4 appears the counter 15 has for example counted to T14 and at the second code pulse element V2 it has counted to T12 and so on. When the second nominal pulse element N2 appears, the second counter 16 starts and it has, for example when the signal pulse element V3 appears, counted to T23.

Each incoming signal pulse element executes the storage routine during the counting course operation of the position of the counters 15, 16 in the memory 25 and 26 respectively as described above with the most significant digits as address information to a certain memory cell and the least significant digits as data in the respective cell. Also possible false signal pulse elements are stored and because of that the memory has to contain as many cells as the number of possible addresses. If it is assumed that each counter consists of a 7-bits binary counter where the 3 last bits are considered as the least significant thus each memory has to include a minimum of 16 cells each with at least 3 bit positions. This means that the incoming signal to the pulse former 12 will lie within a time slot of eight pulses from the clock pulse generator 19. In the case shown in FIG. 2 the memory thus stores the counter positions T11, T12, T13, T14 and T15 in the counter 15 while the memory 26 stores the counter positions T22, T23 and T25 in the counter 16.

As the first signal pulse V1 starts the code pulse generator 13, the memory 25 will store 0 in the first position. As the second signal pulse V2 is assumed to lie in phase with the second nominal pulse N2, the memory 26 will store the same number likewise in the first position. The third signal pulse V3, which is assumed to lie in phase with the nominal pulse N3, opens the comparators for comparison between the content in the memories 25 and 26 and the position of the counter 17. The p most significant digits of the counter 17 give the address of the memory cell in which comparison will occur and the $q$ less significant digits give the data which will be compared with the memory content. In the example according to FIG. 2 the counter 17 thus gives in the first position the address to the first position in the memories 25 and 26 and when the contents thereof agree to the least significant digits in the first position of the counter 17 a coincidence signal is obtained on the output 42 of the AND-circuit 41 which indicates that the desired pulse code has been found in the received video signal.

It can of course happen that a false video pulse, for example an interference starts the pulse generator 13 for the nominal pulse code. This is no obstacle for identification which appears from FIG. 3 showing the contents C of the counter as function of the time $t$. The first video pulse which starts the first counter and establish the time position of the first nominal pulse N1 is here false. When the first incoming signal pulse V1 included in the code appears the counter 15 has then reached the position C1 which is stored in the memory 25. At the time N2 the second nominal pulse, the position of which is determined by the pulse generator 13, will start the second counter 16. At the time V2 the second video pulse included in the pulse code arrives. The counter 16 has then reached the same value C1 as the counter 15 had during the pulse V1. At the time N3 the counter 17 finally starts and the output signals thereof begin to scan the contents of the memory as described above. When the counter 17 has reached the position C1 which corresponds to the third pulse V3 in the code, coincidence is obtained in the comparators 35 and 36 and an identification signal is obtained at the output 39.

The counters have the capacity $C_N$ and when this has been reached the counting stops. If a new pulse should appear when the counter 15 has stopped it starts again even if all other counters would be in operation. As the information in the memories 25, 26 remain in spite of the fact that the pertaining counters have started a new cycle the identification can continue without interruption which is illustrated in FIG. 4.

Here the pulse generator 13 has been started by an interference pulse at the time N1. At the time N2 the second pulse generator 16 starts but at this time no pulse has yet appeared from the right code. The first pulse appears at the time V1 causing the counter position C1 to be stored in the memory 25. Furthermore the position C2 of the counter 16 is of course also stored in the memory 26 but this information may be disregarded in this connection. The second pulse in the code appears at the time V2 and will then in the same way as usual store the position C1 of the counter 16 in the memory 26. But as the counter 15 at that time already has completed a counter cycle and stopped at the value Cn the pulse at V2 will also start a new cycle for the counter 15. Of course the start value of the counter 15 is also written into the memory 25 which in this connection is of no meaning. When the third pulse of the incoming pulse code appears at the time V3 the counter 17 is in the position C1 and at the comparison released by the pulse V3 coincidence is again obtained.

The above examples clearly show that identification of the pulse code can occur at any time and it does not matter if the incoming code pulses arrive irregularly provided the mutual time intervals between the code elements agree with that of the nominal, locally produced code.

FIG. 5 shows more in detail how an arrangement according to the invention may be realized. This arrangement is also provided with means for compensating for a certain, tolerable displacement of the signal pulse positions in comparison with the nominal pulses. The operation of the arrangement in FIG. 5 is described with reference to the pulse diagram in FIG. 6 which shows the course of an identification operation.

The normalized pulse coded signals appear at the input 11. The input 11 is connected on the one hand to a trigger input S of the flip-flop circuit 51, and on the other hand to the input V1 of a shift register 59 which operates as a delay element. The shift register has outputs A0 – A7 from different stages where the output A0 is used in order to delay the video pulse while the other outputs are used in order to achieve a pulse extension.

The first video pulse V1 (FIG. 6a) triggers the flip-flop 51 which applies an opening condition CE to the counter 15 which means that the clock pulses CP from the clock pulse generator 19 can start a counting cycle (FIG. 6c). The counter 15 is assumed from the beginning to be in its final position, i.e. corresponding to the decimal number 127 in the shown 7-bit binary counter.

The generator 13 for the nominal code pulses includes a presettable counter 53 which in the example consists of a 5-bit binary counter. The preset inputs S in the counter 53 are connected to a five poled code selector 14 which thus determines the number preset on the counter. The input L of the counter 53 which controls the preset is connected to an output CY, of the counter 15, which gives an output signal upon completion of a counter cycle. The clock input T of the counter 53 is connected to the output X of a comparator 55. The count outputs Q of the counter 53 are connected to the address inputs AD of a read-only-memory 54. This memory which suitably can be of a changable type, a so called programable read-only-memory has 32 memory cells of 7 bits which all can be addressed from the counter 53.

The seven outputs W from the read-only-memory 54 are connected to one set of data inputs B in the comparator 55. The second set of data inputs A are connected to the outputs Q of the seven counter stages in the counter 15. The comparator thus compares the position of the counter 15 with the contents in the cell in the read-only-memory 54 which is addressed by the counter 53. The comparator 55 is provided with a strobe input ST which is connected to the flip-flop 51 so that the comparator 55 only is active when the counter 15 is operating. Each time the counter 15 has a count which corresponds to the data in the cell the contents of which for the moment is at the output W of the memory 54 the comparator 55 will therefore generate an output pulse which steps the counter 53 forwards one step whereby causing a new cell in the memory 54 to be addressed. The counter 15 continues to count forwards until it comes to a number which corresponds to the contents of this new cell whereupon a new counter pulse for counter 53 is generated and so on. (FIG. 6b)

In the table below an example is given of the operation when two different nominal pulse trains are produced.

| Code selector position (emitted binary number) | Address counter position | Addressed word in the memory | Clock pulse No. when comparator generates the pulse |
|---|---|---|---|
| 1 (00000) | 00000 | 0000000 | 1 |
|  | 00001 | 0001111 | 16 |
|  | 00010 | 1000000 | 65 |
| 2 (00011) | 00011 | 0000000 | 1 |
|  | 00100 | 0100000 | 33 |
|  | 00101 | 1111110 | 127 |

The first address which each selector position puts into the address counter 53 has to address a cell whose contents are equal to the position of the counter 15 after the first clock pulse i.e. in this case (0000000). This position gives the reference point for a pulse code. If we assume that the code selector is in the position 1 the counter 15 will when it has reached the position (0001111) after the 16th clock pulse give a coincidence with the contents of the cell (00001) and produce the second nominal pulse N2. Coincidence is obtained in the same manner after the 65th clock pulse when the last nominal code pulse N3 is produced. The counter 15 then counts forwards to its end position (1111111) which is reached after the 128th clock pulse and stops there.

The pulses from the comparator 55 are also fed to a two-stage binary counter 56, 57 which is re-set by the counter 15 when it reaches its end position. The second pulse from the comparator 55 re-sets the flip-flop 57 set by the first pulse. As the Q-output of this flip-flop is connected to the trigger-input of the flip-flop 58 the later is triggered. The Q-output of the flip-flop 58 is in its turn connected to the start input CE of the counter 16 which opens the counter input T for the clock pulses so that the counter 16 starts its counter cycle (FIG. 6d).

After the third pulse from the comparator 55 the two flip-flops 56 and 57 are set and at the output of the AND-gate 61 a signal N3 is then obtained. This is delayed in a shift register 62 and is applied to the input T of the flip-flop 63 which is set and gives the counter 17 a start condition at the input CE. (FIG. 6e). In fact the pulse N3 has the position N3f according to FIG. 6b. The delay of the start of the counter 17 is necessary in order to allow certain tolerances between the video pulses and time positions of the nominal pulses. This appear clearly from the following.

Each video pulse V1 – V3 which is applied to the delay circuit 59 will appear in sequence at the outputs A0 – A7. The delay to the output A0 corresponds to the desired negative tolerance of the video pulses, i.e. the time a video pulse can be allowed to appear before the nominal time position. In FIG. 6a and b the pulse V2 appears for example before the corresponding nominal pulse N2 in FIG. 6b. A possible tolerance is ±2 clock pulse times. In order to compensate for this delay at the later coincidence control, the start of the counter 17 is also delayed as earlier is described. This delay is equal to the delay of the video pulse + 1 clock pulse period allotted to the writing routine. The delayed video pulse FV1 from the output A0 (FIG. 6f) passes the gate 64 and is applied to one of the data inputs D1 in the memory 65 as a marking bit. The other three inputs D1 in the memory 65 are connected to the three least significant steps at the counter 15. The marking bit plus these three bits from the counter 15 are thus the input data to the memory. The memory 65 has in this case room for 16 cells of 4 bits each and the cells are addressed through the address inputs AD which are connected to a selector 66. This selector can alternatively connect the address input to the four most significant stages of the counter 15 or to corresponding stages of the counter 17. The selector is controlled by means of signals at the conductor 70, which also control the writing and reading in the memory 65. When the signal at the conductor 70 has a low level, the data is written into a memory cell whose address is determined by the position of the counter 15, while a high level of the signal achieves reading in a cell whose address is determined by the position of the counter 17. The signal at the conductor 70 is produced by the logic addition of the outgoing signals from the terminals A1 – A7 at the delay circuit 59. The delay between each of the terminals A0 – A7 is a clock pulse period. During the clock pulse period when the delayed video pulse (SP1) only appears at the output A0 the writing occurs therefore of the marking bit + the position of the counter 15. (FIG. 6g). During the 7 clock pulses (LP1) following thereafter the OR-circuit 69 gives the conductor 70a high level and the memory is switched for reading. (FIG. 6h). The extension of the delayed video pulse with 7 + 1 pulse periods is to prevent more than one registration with the same address from being stored for each address appears during 8 clock pulse periods.

The data outputs DU from the memory 65 are connected to the data inputs A of a comparator 71, the second data inputs B of which are connected on the one hand to the least significant stages of the counter 17 and on the other hand to a control potential VC which corresponds to the marking bit in a memory cell. The comparator is controlled by the start signal CE of the counter 17 so that the comparison only can occur when the counter 17 is operating. However, the comparator is not active when only the first video pulse has appeared.

The second delayed signal pulse will register the three least significant digits of the counter 16 in the memory cell in the memory 67, the address of which is determined by the four most significant digits in this counter. As soon as the counter 16 has started the signal CE will open the gate 74 so that a marking bit can be written into the memory 67 together with the position of the counter 16. The memory 65 will of course also store the three least significant digits of the counter 15 + the marking bit but this registration can be disregarded in this connection.

The output A0 for delayed video pulses is connected on the one hand to the inverted reset inputs R, and on the other hand to the data inputs D in the flip-flops 75 and 76 the clock inputs G of which are connected to the outputs X of the comparators 71 and 72 respectively. The reset inputs reset the flip-flops 75, 76 unconditionally as soon as the delayed video pulse is missing. When the delayed video pulse appears the flip-flops can, however, be set only if the respective comparator 71, 72 indicates that the input A has the same data as the input B in which case a coincidence signal is at the output X. The outputs Q are connected to the AND-gate 77 which has the output VK.

When the third nominal pulse N3 after delay in the circuit 62 to the pulse position N3f starts the counter 17 the comparators 71 and 72 obtain opening conditions at the input ST. As soon as the read pulse LP3 is received at the read pulse conductor 70 reading of the memories 65 and 67 starts with the read address being generated by the four most significant bits in the counter 17.

It is assumed that the pulse V1 and N1 appear simultaneously and that the pulse FV1 is delayed 2 clock pulse periods. In this case the number 2 is written into the first cell in the memory 65. Further assume that the pulse V2 appears two clock pulse periods before the pulse N2. As the delayed pulse FV2 produces the write pulse just when the counter 16 is set in its first position the memory 67 will store the number 0 in its first cell.

Thus the counter 17 will in its first position address a cell, the first, in the memory 67 which has the same content 0 as the three less significant steps of the counter and the comparator 72 emits an output signal at the output X (X2 FIG. 6j) as an indication that coincidence is obtained and the flip-flop 76 is triggered. When the counter 17 is in its third position it addresses in the same way the first cell in the memory 65 which has the same contents 2 as the three less significant steps in the counter and the comparator 71 emits an output signal at the output X (X1 FIG. 6i) as a sign of coincidence and the flip-flop 75 is triggered. When the two flip-flops 75, 76 have been triggered the gate 77 is opened and an outgoing signal Vk is obtained as a signal that a code has been found in the incoming video pulses which, within given tolerances, agrees with the locally produced nominal code. After the verification all the counters 15, 16, 17 continue to count until they reach their end position where they are stopped by the carry-signal Cy which resets the respective start flip-flop 51, 58, 63. The start flip-flop 51 which consists of a normal SR-flip-flop is reset instantaneously so that the output position of the counter is 1111111. The counters 16 and 17 have no time to start on the clock pulse which puts the counter 56, 57 in start position but not until a clock pulse later owing to the circuit delay. Thus, the counters 16, 17 are given the rest position 000000 by allowing them to step one step after the signal CY has been received. This is achieved by the fact that the start flip-flops are master-slave-type JK flip-flops where the K-input is connected to the output CY in respective counter.

It is of course also possible within the scope of the invention as defined in the claims, to execute a verification arrangement in analog techniques. In this case the counters 15, 16, 17 are replaced for example by integrators (ramp generators) and the digital memory circuits are replaced by analog memories, i.e., suitably capacitive holding circuits of the kind used in analog-digital-converters.

We claim:

1. Arrangement for verification that a received sequence of signal pulses includes a certain pulse pattern consisting of N signal pulses distributed in a determined manner in time comprising a code pulse source for local production of said pulse pattern in response to a received signal pulse, a group of N-1 time measuring circuits which are arranged to be started by each one of the N-1 first locally produced pulses and a further time measuring circuit which is arranged to be started by the Nth locally produced pulse, memory means for storing the measuring values from said group of time measuring circuits during an initial part of each incoming signal pulse, and for reading the measuring values thus stored at least during the later part of each signal pulse, and, means for comparing the measuring values thus stored with the measuring values of the further time measuring circuit, and means for emitting a verification signal when the last mentioned time measuring circuit reaches a measuring value which is found in all the memory means.

2. Arrangement according to claim 1 wherein the time measuring circuits comprise a clock pulse source and a plurality of counters controlled by said clock pulse source, which also controls the local generation of the pulse pattern.

3. Arrangement according to claim 2 wherein the memory means include $p$ memory cells each with $q$ bit positions, and the counters are so connected to the memory means that the $p$ most significant positions of the counters give the address to the memory cells while their $q$ least significant positions give the contents in the cells thus addressed.

4. Arrangement according to claim 3 further comprising selectors for connecting at predetermined times the address inputs of the memory means allotted to the respective counters of said group of N-1 time measuring circuits and for connecting at a later time the address inputs to the counter of said further time measuring circuit.

5. Arrangement according to claim 1 wherein said memory means stores the measuring value in response to said memory means receipt of a signal pulse.

6. Arrangement according to claim 5 further including means for delaying the transmission of the signal pulses to said memory means for a predetermined period of time.

7. Arrangement according to claim 6 further including means for delaying the start of said further time measuring circuit by another predetermined period of time.

* * * * *